(12) United States Patent
Wang et al.

(10) Patent No.: US 7,525,892 B2
(45) Date of Patent: Apr. 28, 2009

(54) METHOD OF ERASING AN ERASABLE DISC

(75) Inventors: Yi-Shih Wang, Taipei (TW);
Kuo-Chiang Chang, Taipei (TW);
Ling-Feng Chen, Taipei (TW)

(73) Assignee: Lite-On It Corporation, Taipei (TW)

( * ) Notice: Subject to any disclaimer, the term of this patent is extended or adjusted under 35 U.S.C. 154(b) by 627 days.

(21) Appl. No.: 11/142,339

(22) Filed: Jun. 2, 2005

(65) Prior Publication Data
US 2005/0270950 A1    Dec. 8, 2005

(30) Foreign Application Priority Data
Jun. 4, 2004    (TW) .............. 93116158 A

(51) Int. Cl.
*G11B 7/00*    (2006.01)
(52) U.S. Cl. ............... 369/59.11; 369/47.52
(58) Field of Classification Search ......... None
See application file for complete search history.

(56) References Cited

U.S. PATENT DOCUMENTS

| | | | | |
|---|---|---|---|---|
| 5,732,055 | A * | 3/1998 | Masaki et al. ............ | 369/53.26 |
| 5,867,463 | A * | 2/1999 | Chiba ...................... | 369/53.35 |
| 6,115,338 | A * | 9/2000 | Masaki et al. ............ | 369/47.52 |
| 2003/0086345 | A1* | 5/2003 | Ueki ........................ | 369/47.51 |
| 2006/0176794 | A1* | 8/2006 | Ueki ........................ | 369/53.2 |

* cited by examiner

*Primary Examiner*—Wayne R Young
*Assistant Examiner*—Van N Chow
(74) *Attorney, Agent, or Firm*—WPAT., P.C.; Justin King

(57) ABSTRACT

A method of erasing an erasable disc. When an optical drive is erasing a DVD-RW disc, a write mode, instead of a conventional erase mode, is used to execute an erase operation. In the write mode, the invention sets current values of individual current paths in a laser diode drive circuit such that a laser diode always outputs a constant erase power (Pe) onto the DVD-RW disc-no matter how a write pulse signal changes. Thus, after a starting position of the DVD-RW disc is determined, the optical drive only needs to write a data amount of n ECC blocks to complete the disc erasing operation without continuously detecting the LPP (Land Pre-Pit) data block to obtain a stop erasing position on the disc in the conventional optical drive.

16 Claims, 4 Drawing Sheets

① : Sw On, Se On, Sb Off
② : Sw Off, Se On, Sb Off
③ : Sw Off, Se Off, Sb On

① : Sw On, Se On, Sb Off

② : Sw Off, Se On, Sb Off

③ : Sw Off, Se Off, Sb On

METHOD OF ERASING AN ERASABLE DISC

This application claims the benefit of Taiwan application Serial No. 93116158, filed Jun. 4, 2004, the subject matter of which is incorporated herein by reference.

BACKGROUND OF THE INVENTION

1. Field of the Invention

The invention relates in general to a method of erasing an erasable disc, and more particularly to a method of erasing a DVD-RW disc without continuously detecting a LPP (Land Pre-Pit) data block.

2. Description of the Related Art

Because the DVD disc can store a large amount of data, it is very suitable for the storage of the high quality video and audio data with a huge data amount. Furthermore, because of the mass production of the DVD optical drives, the recordable DVD disc and the erasable DVD disc have been gradually used by the consumer to backup the large amount of data.

According to the DVD-RW specification, LPP (Land Pre-Pit) data blocks are recorded between two adjacent helical tracks on the DVD-RW disc. The LPP data block represents the actual address on the track of the DVD-RW. The track length represented by each LPP data block corresponds to the data amount that can be recorded in one ECC (Error Correction Code) block. Thus, the data of each ECC block on the DVD-RW disc may correspond to the position specified by one LPP data block. An ECC block address is also recorded in the data of each ECC block, and the ECC block address is the same with LPP data block.

FIG. 1 is a flow chart showing a conventional optical drive for executing an erase operation in an erase mode. The method includes the following steps.

In step 10, a starting address and an ending address of the ECC blocks are obtained in the erase mode.

In step 20, a start erasing position is obtained by seeking a corresponding LPP data block on the DVD-RW disc according to the starting address of the ECC block.

In step 30, a laser beam with an erase power is provided at the start erasing position of the DVD-RW disc.

In step 40, an erase operation is executed, and the LPP data block at which the laser beam positioned is detected.

In step 50, it is judged that whether or not the LPP data block, at which the laser beam positioned, matches with the ending address of the ECC block, and the process jumps to step 40 if yes, or otherwise to step 60.

In step 60, the erase operation ends.

In the erase mode, the optical drive gets an erase instruction from a host. At this time, the optical drive obtains the starting address and the ending address of the ECC blocks according to the erase instruction. Next, the optical drive detects the correspondent LPP data block on the DVD-RW disc as the starting position, and drives the laser diode to provide an erase power (Pe) from the starting position to erase data on the tracks of the DVD-RW disc. While the optical drive is erasing the data on the tracks of the DVD-RW disc, the LPP data block has to be continuously detected so that whether or not the ending address of the ECC block has been reached can be obtained. When the LPP data block is assured to be the ending address of the ECC block, the erase operation ends.

However, the DVD-RW disc can be rewritten multiple times. After the DVD-RW disc has been rewritten or erased multiple times, the LPP data block on the DVD-RW disc cannot be easily detected. The optical drive has to continuously detect the LPP data block while executing the erase operation in the erase mode. If the optical drive cannot detect the LPP data block to determine the stop erasing position, the optical drive continues executing the erase operation on the tracks, thereby causing the data lost or the erase failure.

FIG. 2 is a schematic illustration showing a conventional laser diode drive circuit of an optical drive. Typically, multiple current paths are superimposed to drive the laser diode. In the laser diode drive circuit as shown in FIG. 2, Ib is a bias current, Ie is an erase current, and Iw is a write current. The current value of each current path may be set individually, and a control switch (Sb, Se, Sw) is disposed on each current path to control the on and off states of the current.

FIGS. 3a and 3b respectively show a recording data signal and a write pulse signal in a write mode. As shown in FIG. 3a, if the recording data signal is 6T, the control chip set in the optical drive controls the laser diode to generate the write pulse signal of FIG. 3b. The switch Sb is on and the switches Se and Sw are off, such that the current Ib flows though the laser diode and the fundamental power of Pb is generated, as shown in zone 3. The switch Se is on and the switches Sw and Sb are off, such that the current Ie flows though the laser diode and the erase power Pe is generated, as shown in zone 2. The switches Se and Sw are on and the switch Sb is off, such that the currents Ie and Iw flow though the laser diode to generate the write power Pw, as shown in zone 1. That is, the control chip of the optical drive can control the switches Sb, Se and Sw to enable the laser diode drive circuit to generate the write pulse signal according to the recording data signal.

SUMMARY OF THE INVENTION

It is therefore an object of the invention to provide a method of erasing an erasable DVD-RW disc without continuously detecting a LPP data block by an optical drive.

The invention achieves the above-identified object by providing a method of erasing a disc. The method includes the steps of: obtaining n blocks according to a starting block address and an ending block address; setting an output power of a laser diode such that the output power outputted according to a write pulse signal is a specific power; determining a starting position on the disc according to the starting block address; and starting, from the starting position, to convert data of the n blocks into the write pulse signal to drive the laser diode.

The invention also achieves the above-identified object by providing a method of erasing a disc. The method includes the steps of: receiving a starting block address and an ending block address; determining to write n blocks of data amount onto the disc according to the starting block address and the ending block address; encoding the n blocks of data amount into a recording data signal; converting the recording data signal into a write pulse signal; determining a starting position on the disc according to the starting block address; and starting, from the starting position, to drive a laser diode by using the write pulse signal, wherein an output power of the laser diode is reset such that the output power outputted according to the write pulse signal is a specific power.

The invention further achieves the above-identified object by providing a method of erasing a disc. The method includes the steps of: receiving a starting block address from which the disc is to be erased; determining a starting position on the disc according to the starting block address; and starting, from the starting position, to write n blocks of data amount onto the disc, wherein the disc is written by driving a laser diode, which is configured such that an output power outputted by the laser diode is kept at a specific power.

Other objects, features, and advantages of the invention will become apparent from the following detailed description of the preferred but non-limiting embodiments. The following description is made with reference to the accompanying drawings.

DETAILED DESCRIPTION OF THE INVENTION

In an erasable DVD-RW disc, for example, a track Length represented by each LPP (Land Pre-Pit) data block can record the data amount of one ECC block. So, an optical drive has to write the DVD-RW disc by taking the data amount of the ECC block as a unit, wherein the data of each ECC block contains the address of the ECC block.

According to the DVD-RW specification, each ECC block comprises 2K bytes encoded main data and an assigned ECC block address. The encoded ECC block has to be modulated by way of 8 to 16 Modulation so that a recording data signal satisfying the RLL (Run-Length-Limited) (2,10) is generated. Finally, the recording data signal is further converted into a write pulse signal, which drives the laser diode to complete the operation of writing the DVD-RW disc.

In the write mode, the control chipset in the optical drive continuously encodes all of the to-be-written data into the ECC block by taking 2K bytes as a unit. At the beginning of the write operation, the optical drive seeks the LPP data block at the starting position of the DVD-RW disc as a first ECC block address, and starts to write the first ECC block data from the starting position. Thereafter, all the ECC blocks with ascending addresses are sequentially written on the tracks of the disc. When all the ECC blocks are converted into the write pulse signal to drive the laser diode and execute the operation of writing the DVD-RW disc, the control chipset writes the data amount of each ECC block on the track at which the corresponding LPP data block positioned. That is, after the optical drive finishes the operation of writing the DVD-RW disc, the ECC block represented by the ECC block address aligns with the corresponding LPP data block.

In the write mode, the control chipset of the optical drive continuously encodes the to-be-written data into the ECC block and controls each ECC block to align with the individual LPP data block of the DVD-RW disc during the writing operation. The invention utilizes the property of the control chipset of the optical drive in the write mode to perform the operation of erasing the DVD-RW disc so as to avoid the write error caused by the optical drive that has to continuously detect the LPP data block in the erase mode.

Figure 1:
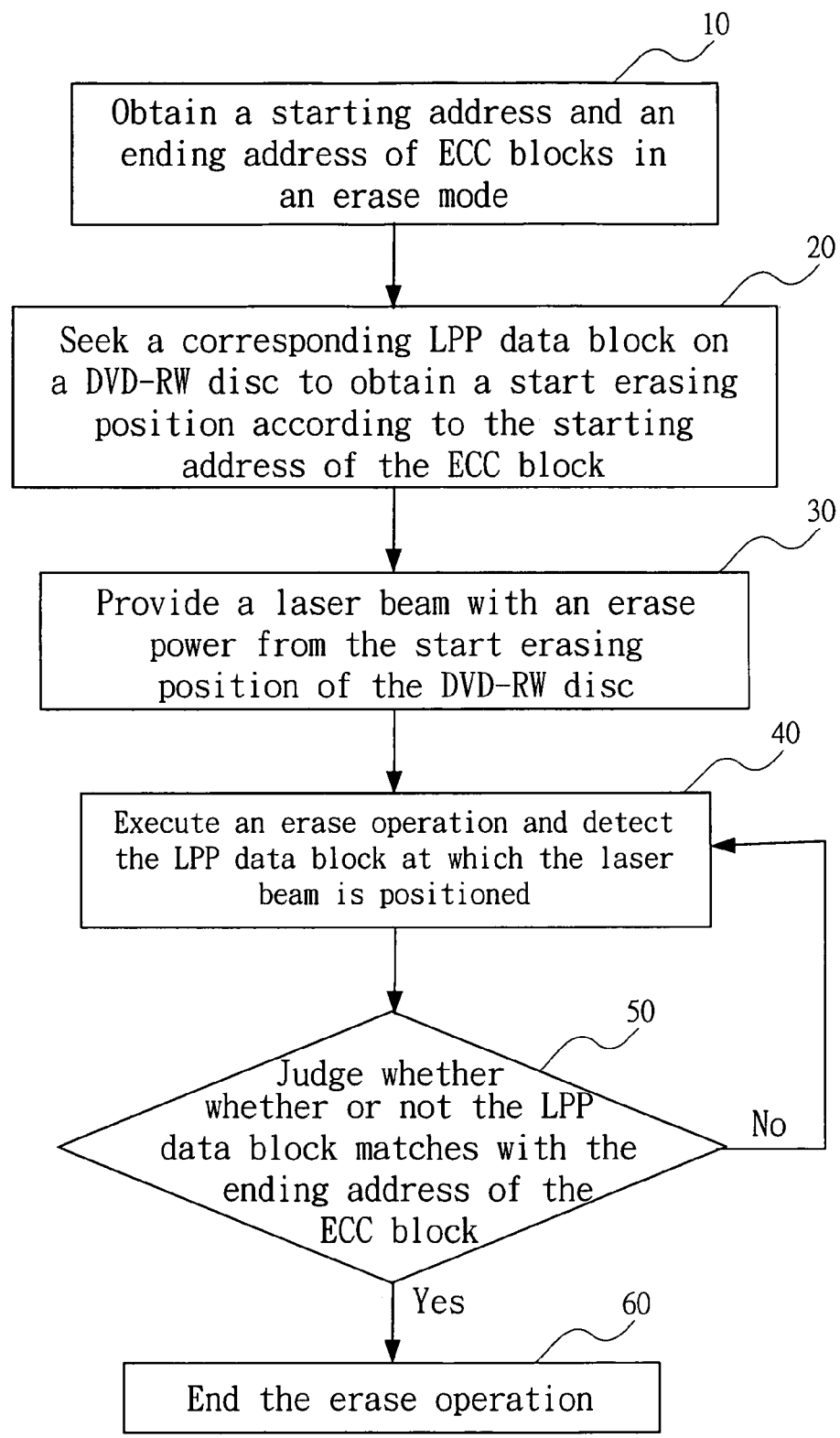
FIG. 1 is a flow chart showing a conventional optical drive for executing an erase operation in an erase mode.
Figure 2:
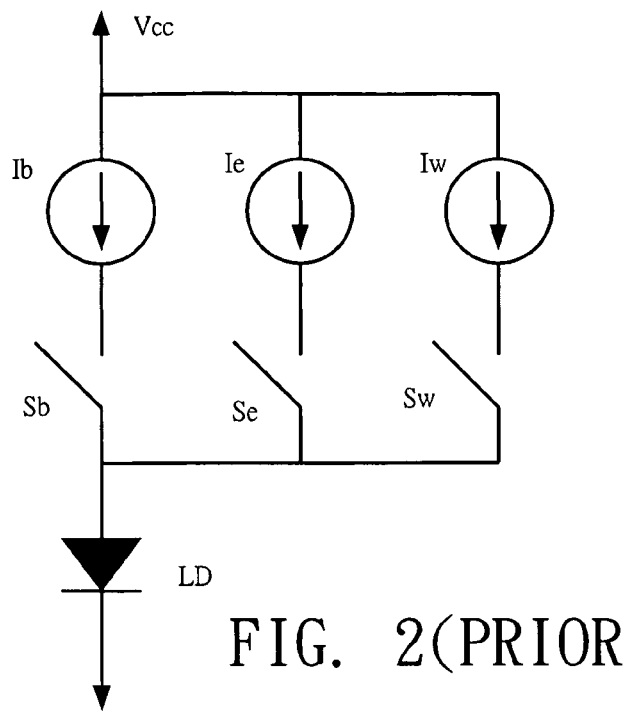
FIG. 2 is a schematic illustration showing a conventional laser diode drive circuit of an optical drive.
Figure 3A:
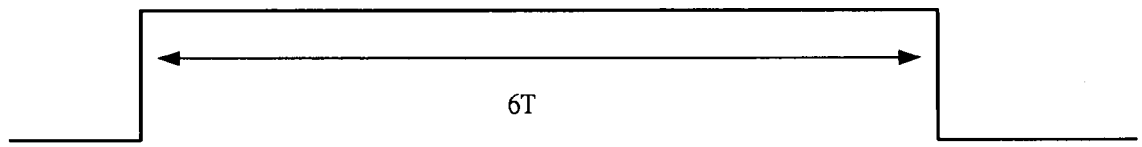
FIGS 3a and 3b respectively show a recording data signal and a write pulse signal in a write mode in a conventional practice.
Figure 3B:
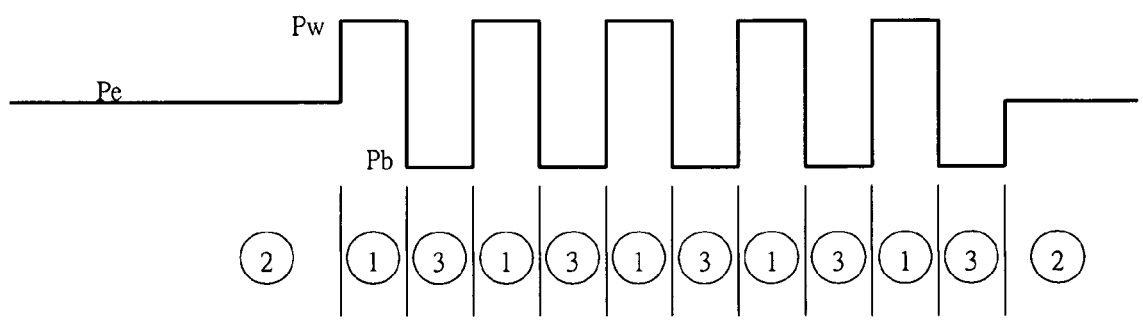
Figure 4:
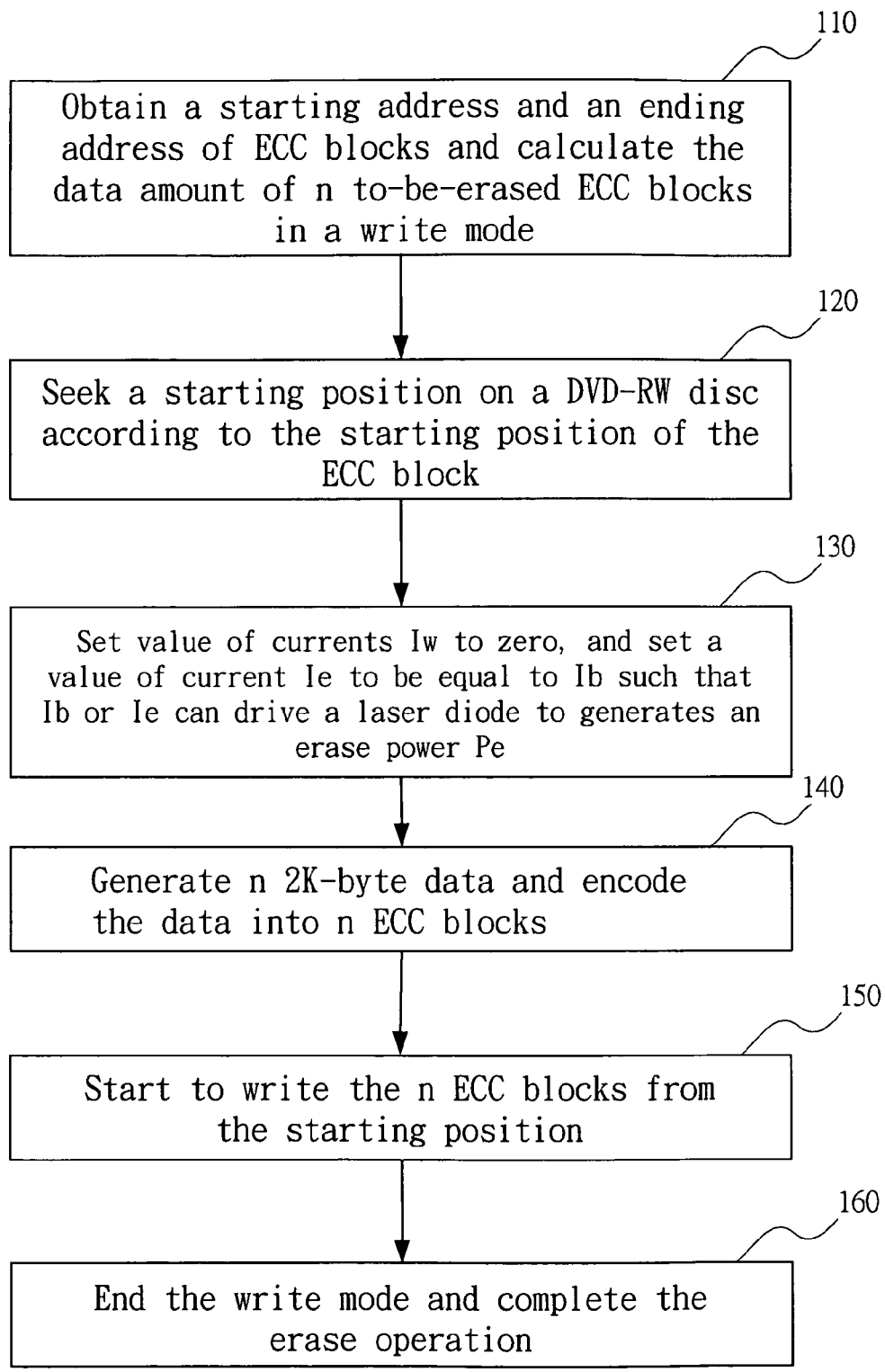
FIG. 4 is a flow chart showing a method of erasing a disc in the write mode according to the invention.

FIG. 4 is a flow chart showing a method of erasing a disc in the write mode according to the invention. The method includes the following steps.

In step 110, a starting address and an ending address of the ECC blocks are obtained in the write mode so that the data amount of n to-be-erased ECC blocks is calculated.

In step 120, a starting position on the DVD-RW disc is sought according to the starting address of the ECC block.

In step 130, the values of the currents Iw is set to zero and Ib is set to be equal to Ie, and the value of the current Ie is configured to drive the laser diode to generate the erase power Pe.

In step 140, the data of n 2K bytes is generated and then encoded into n ECC blocks.

Step 150 starts to write the n ECC blocks from the starting position.

Step 160 ends the write mode and completes the erase operation.

In this invention, the optical drive gets an erase instruction from the host. Then, the optical drive gets the starting address and the ending address of the to-be-erased ECC blocks, and determines the total number of the to-be-erased ECC blocks (step 110). Furthermore, the starting position on the disc is found according to the starting address of the ECC block (step 120). According to this embodiment of the invention, the starting position may be obtained by seeking the corresponding LPP data block on the DVD-RW disc according to the starting address of the ECC block or by determining the ECC block address after decoding the data of the previously written ECC block on the disc.

The invention resets the value of the currents Iw to be zero, and sets the same value of the current Ib and Ie such that the current Ie or Ib can drive the laser diode to generate the erase power Pe (step 130). So, in the write mode, after arbitrary n sets of 2K-byte data are encoded into the data of n ECC blocks (step 140), the control chipset is controlled to generate the recording data signal and the corresponding write pulse signal. No matter what the write pulse signal is, when the pulses are present (Sw and Se are On, and Sb is Off), the laser driving current is Ie and when the pulses are absent (Sw and Se are Off, and Sb is On), the laser driving current is Ib. That is to say, because the currents Ib and Ie are the same, the generated write pulse signal only can drive the laser diode to generate the erase power Pe, which corresponds to the erase power generated in the erase mode of the conventional optical drive. Therefore, after the optical drive starts, from the starting position, to write the data amount of n ECC blocks along the tracks (step 150), the optical drive can automatically erase the data until the ending address of the ECC block.

That is, because the optical drive is in the write mode, the control chipset of the optical drive automatically aligns each ECC block with the LPP data block. Thus, after the optical drive finishes writing the n ECC blocks with the erase power Pe, the position of the final ECC block is inevitably the ending address of the LPP data block of the DVD-RW disc. That is, the DVD-RW disc of the invention does not have to continuously detect the LPP data block during the erasing process. Instead, the DVD-RW disc only has to find the starting address of the ECC block and then start to write the n ECC blocks from the position.

According to the invention, when a laser diode drive circuit is performing the erase operation in the write mode, the current values of the individual current paths have to be reset such that the control chipset controls the laser diode drive circuit according to the recording data signal and outputs a write pulse signal with a constant erase power (Pe). Therefore, after the optical drive gets the starting address and the ending address of the ECC blocks, the erase operation between the starting address and the ending address of the ECC blocks may be achieved only by finding the starting position of the DVD-RW disc corresponding to the starting address of the ECC block and then writing the data amount of n ECC blocks without the need of continuously detecting the LPP data block.

Figure 5:
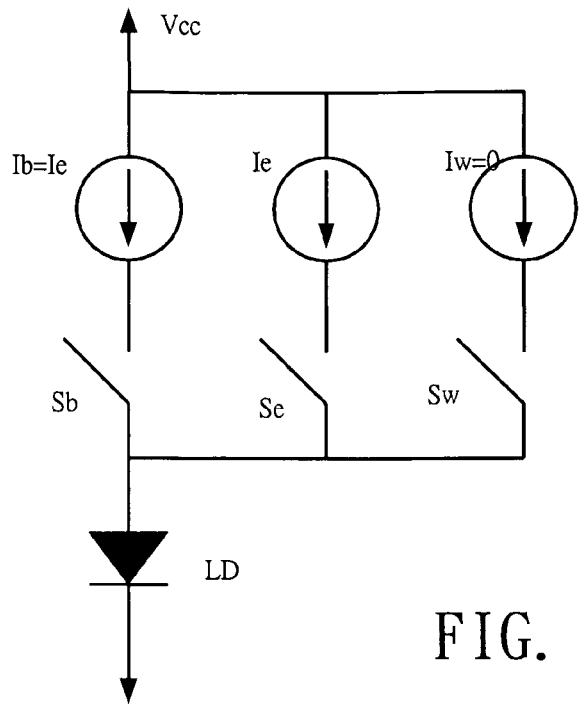
FIG. 5 is a schematic illustration showing a laser diode drive circuit of an optical drive according to the invention.

FIG. 5 is a schematic illustration showing a laser diode drive circuit of an optical drive according to the invention. Typically, three values of currents (Iw, Ib, Ie) are reset. That is, set the value of the currents Iw to be zero, and set the same value of the current Ib and Ie such that the current Ie or Ib can drive the laser diode to generate the erase power Pe.

Figure 6A:
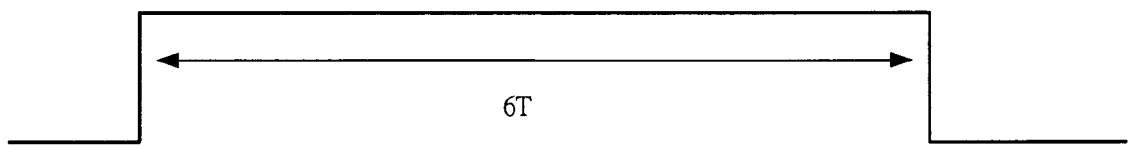
FIGS. 6a and 6b respectively show a recording data signal and a write pulse signal in a write mode according to the invention.
Figure 6B:
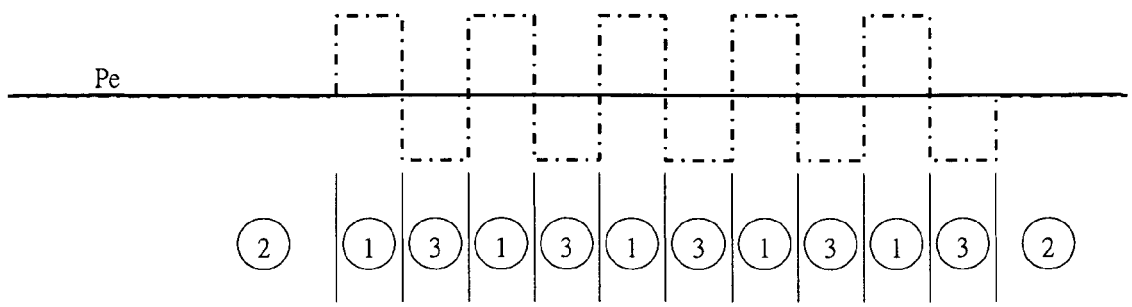

FIGS. 6a and 6b respectively show a recording data signal and a write pulse signal (dotted line) in a write mode according to the invention. As shown in FIG. 6a, if the recording data signal is 6T, the control chip set in the optical drive controls the laser diode to generate the write pulse signal (dotted line) of FIG. 6b. No matter what the write pulse signal is, when the pulses are present (Sw and Se are On, and Sb is Off), the laser driving current is Ie and when the pulses are absent (Sw and Se are Off, and Sb is On), the laser driving current is Ib. That is to say, because the currents Ib and Ie are the same, the generated write pulse signal only can drive the laser diode to generate the erase power Pe, which corresponds to the erase power generated in the erase mode of the conventional optical drive.

Consequently, the advantage of the invention is to disclose a method of erasing a disc. When the optical drive is erasing the DVD-RW disc, the current values of the individual current paths in the laser diode drive circuit are set in the write mode such that the laser diode can output the constant erase power (Pe) to the DVD-RW disc regardless of the change of the write pulse signal. Thus, after the starting position of the DVD-RW disc is determined, the optical drive can complete the operation of erasing the disc only by writing n ECC blocks along the tracks without the need of continuously detecting the LPP data block to assure the stop erasing position on the DVD-RW disc in the prior art optical drive.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of erasing a disc, the method comprising the steps of:
   obtaining n blocks according to a starting block address and an ending block address;
   setting a write pulse signal, wherein a laser diode is controlled to output an erase power when pulses of the write pulse signal are present, and the laser diode is also controlled to output the erase power when pulses of the write pulse signal are absent;
   determining a starting position on the disc according to the starting block address; and
   starting, from the starting position, to convert data of the n blocks into the write pulse signal to drive the laser diode.

2. The method according to claim 1, wherein the disc is a DVD-RW disc.

3. The method according to claim 1, wherein each of the blocks is an ECC (Effor Correction Code) block, the starting block address is an ECC block starting address, and the ending block address is an ECC block ending address.

4. The method according to claim 1, wherein the starting position is determined according to a LPP (Land Pre-Pit) data block corresponding to the starting block address on the disc.

5. The method according to claim 1, wherein the starting position is determined by decoding the previously written ECC blocks on the disc.

6. A method of erasing a disc, the method comprising the steps of:
   receiving a starting block address and an ending block address;
   determining to write n blocks of data amount onto the disc according to the starting block address and the ending block address;
   encoding the n blocks of data amount into a recording data signal;
   converting the recording data signal into a write pulse signal;
   determining a starting position on the disc according to the starting block address; and
   starting, from the starting position, to drive a laser diode by using the write pulse signal,
   wherein the laser diode is controlled to output an erase power when pulses of the write pulse signal are present, and the laser diode is also controlled to output the erase power when pulses of the write pulse signal are absent.

7. The method according to claim 6, wherein the disc is a DVD-RW disc.

8. The method according to claim 6, wherein each of the blocks is an ECC (Effor Correction Code) block, the starting block address is an ECC block starting address, and the ending block address is an ECC block ending address.

9. The method according to claim 6, wherein the starting position is determined according to a LPP (Land Pre-Pit) data block corresponding to the starting block address on the disc.

10. The method according to claim 6, wherein the starting position is determined by decoding the previously written ECC blocks on the disc.

11. A method of erasing a disc, the method comprising the steps of:
    receiving a starting block address from which the disc is to be erased;
    determining a starting position on the disc according to the starting block address; and
    starting, from the starting position, to write n blocks of data amount onto the disc,
    wherein the disc is written by driving a laser diode controlled by a write pulse signal and the laser diode is controlled to output an erase power when pulses of the write pulse signal are present and absent.

12. The method according to claim 11, wherein the n blocks are determined according to the starting block address and an ending block address.

13. The method according to claim 11, wherein the disc is a DVD-RW disc.

14. The method according to claim 11, wherein each of the blocks is an ECC (Effor Correction Code) block, the starting block address is an ECC block starting address, and the ending block address is an ECC block ending address.

15. The method according to claim 11, wherein the starting position is determined according to a LPP (Land Pre-Pit) data block corresponding to the starting block address on the disc.

16. The method according to claim 11, wherein the starting position is determined by decoding the previously written ECC blocks on the disc.

* * * * *